(12) United States Patent
Osara et al.

(10) Patent No.: US 9,114,696 B2
(45) Date of Patent: Aug. 25, 2015

(54) ROCK DRILLING RIG, METHOD FOR CONTROLLING THE TEMPERATURE OF ITS DRIVE EQUIPMENT, AND LIQUID COOLING SYSTEM

(75) Inventors: Jukka Osara, Tampere (FI); Juha Piipponen, Tampere (FI); Jarno Kuittinen, Tampere (FI); Timo Niemi, Tampere (FI)

(73) Assignee: SANDVIK MINING AND CONSTRUCTION OY, Tampere (FI)

( * ) Notice: Subject to any disclaimer, the term of this patent is extended or adjusted under 35 U.S.C. 154(b) by 479 days.

(21) Appl. No.: 13/698,299

(22) PCT Filed: May 24, 2011

(86) PCT No.: PCT/FI2011/050470
§ 371 (c)(1),
(2), (4) Date: Nov. 16, 2012

(87) PCT Pub. No.: WO2011/148052
PCT Pub. Date: Dec. 1, 2011

(65) Prior Publication Data
US 2013/0056271 A1 Mar. 7, 2013

(30) Foreign Application Priority Data
May 25, 2010 (FI) ...................................... 20105577

(51) Int. Cl.
*G06F 7/70* (2006.01)
*G06F 19/00* (2011.01)
*B60K 6/00* (2007.10)
*B60K 11/02* (2006.01)
*E21B 7/02* (2006.01)

(52) U.S. Cl.
CPC . *B60K 6/00* (2013.01); *B60K 11/02* (2013.01); *E21B 7/02* (2013.01); *B60W 2300/17* (2013.01); *B60Y 2200/41* (2013.01); *Y02T 10/6208* (2013.01)

(58) Field of Classification Search
USPC ....................................................... 701/1, 50
See application file for complete search history.

(56) References Cited

U.S. PATENT DOCUMENTS

| 2006/0076840 A1 | 4/2006 | Yamaguchi |
| 2008/0121448 A1 | 5/2008 | Betz |
| 2010/0065354 A1 | 3/2010 | Sakuma |
| 2010/0086359 A1 | 4/2010 | Saleniemi |

FOREIGN PATENT DOCUMENTS

| DE | 3934084 A1 | 4/1991 |
| EP | 1199410 A1 | 4/2002 |
| JP | 2008267260 | 6/2008 |

*Primary Examiner* — Bhavesh V Amin
(74) *Attorney, Agent, or Firm* — Corinne R. Gorski

(57) ABSTRACT

The invention relates to a rock drilling rig, a method for controlling the temperature of its drive equipment, and a liquid cooling system. The rock drilling rig includes combustion-engine-free drive equipment, which includes electric components for affecting transfer drive. The rock drilling rig is also provided with a liquid cooling system, to which one or more electric components affecting the transfer drive are connected to be cooled by the system. The cooling of the components is controlled by a control unit according to a strategy set therein. The cooling system may additionally be precooled before the transfer drive.

27 Claims, 3 Drawing Sheets

ROCK DRILLING RIG, METHOD FOR CONTROLLING THE TEMPERATURE OF ITS DRIVE EQUIPMENT, AND LIQUID COOLING SYSTEM

RELATED APPLICATION DATA

This application is a §371 National Stage Application of PCT International Application No. PCT/FI2011/050470 filed May 24, 2011 claiming priority of Finnish Application No. 20105577, filed May 25, 2010.

BACKGROUND OF THE INVENTION

The invention relates to a rock drilling rig comprising a drilling boom provided with a rock drilling machine such that drilling can be carried out with it at selected drilling sites. The rock drilling rig also comprises drive equipment by which it may be transferred between drilling sites. The drive equipment of the rock drilling rig comprises at least one electric motor, at least one electric control device for affecting transfer drive, and at least one energy storage for storing electric energy required for transfer drive.

The invention further relates to a method for controlling the temperature of drive equipment of a rock drilling rig, and a liquid cooling system.

The field of the invention is described in more detail in the preambles of the independent claims of the application.

In mines, rock drilling rigs are used to drill boreholes at planned drilling sites. When the boreholes have been drilled, the rock drilling rig is transferred to the next drilling site for drilling a new drilling fan or face. In particular, in underground mines it is advantageous to perform transfer drive by means of power produced by an electric motor. The energy required by the transfer drive may be stored in a battery. During the transfer drive, electric components of the drive equipment become loaded and heated. Overheating may damage the component. So, the highest power in the transfer drive has to be limited typically such that the temperature of the electric components of the drive equipment will remain within allowable limits. Because of power limitations the speed of the transfer drive has to be reduced, which weakens the performance of the rock drilling rig.

BRIEF DESCRIPTION OF THE INVENTION

The object of the present invention is to provide a novel and improved rock drilling rig and a liquid cooling system thereof. A further object is to provide a novel and improved method for controlling the temperature of drive equipment of a rock drilling rig.

The rock drilling rig of the invention is characterized in that the rock drilling rig comprises at least one liquid cooling system, to which at least one electric component affecting the transfer drive is connected; and that a control unit is arranged to control the cooling of the electric component connected to the liquid cooling system; and that the liquid cooling system is precoolable before the following transfer drive.

The method of the invention is characterized by cooling the electric component being monitored by means of a liquid cooling system; and precooling the liquid cooling system before starting the transfer drive and thus preparing in advance for the following temperature rise in the transfer drive.

The system of the invention is characterized in that the liquid cooling system is connected with, as components to be cooled, electric components of drive equipment affecting the transfer drive; and that the liquid cooling system comprises means for precooling it before the transfer drive.

The idea is that the rock drilling rig comprises a liquid cooling system that cools one or more electric components of the drive equipment, loaded and heated during transfer drive. The liquid cooling system may further be precooled already before transfer drive.

This provides an advantage that, due to liquid cooling, critical electric components of the drive equipment can be loaded during transfer drive more than before. Long transfer distances may then be driven at a higher driving speed, wherefore the proportion of time used for drilling, which is the actual main task, in the total operating time of the apparatus may be bigger. This improves the efficiency of the rock drilling rig. Furthermore, it is possible to take into account a better loadability in the selection of the components such that components with a smaller rated load can be used in the drive equipment. It is thus possible to decrease the component costs of the drive equipment. With the precooling of the system, it is possible to prepare in advance for the next transfer drive and the temperature rise during that drive.

The idea of an embodiment is that the temperature of one or more electric components of the drive equipment is monitored by means of a heat sensor and cooling of the component being monitored is increased on the basis of the detected heat load. The system may comprise a component-specific cooling control, whereby the cooling of each component may be boosted in response to the temperature rise of the component. It is thus possible to improve the loadability of a single critical component by means of the cooling.

The idea of an embodiment is that the cooling power for less critical electric components of the drive equipment is reduced and the cooling power for critical components is increased at least when the transfer drive is carried out at a high speed. With this embodiment, the cooling capacity of the liquid cooling system may be focused efficiently on improving the loadability of the components that affect the transfer drive most.

The idea of an embodiment is that the drive equipment comprises at least one frequency converter for controlling the electric motor included in the drive equipment. The electric motor and the frequency converter are usually critical components of the drive equipment, wherefore their temperature is monitored and wherefore they are connected to a liquid cooling system.

The idea of an embodiment is that the electric motor serves as a drive motor connected to at least one traction wheel by means of a mechanical anti-slip power transmission connection. The electric drive motor is arranged to serve as a generator in the braking during transfer drive, producing electric energy to the electric system of the rock drilling rig. The electric system is provided with one or more electric brake resistors, by which surplus electric energy produced during braking can be converted into heat. These brake resistors may be connected to the liquid cooling system, which makes it possible to increase their loadability. As the brake resistors may be loaded more than before, it is possible to drive downhill at a higher speed than before.

The idea of an embodiment is that the energy storage is connected to the liquid cooling system. The energy storage, such as a battery, a battery group or a battery package, is loaded and heated when electric current is charged thereto or intensely discharged therefrom. The energy storage may be cooled by the system, whereby its ability to receive electric current charged during down-hill driving or drilling improves and, accordingly, its ability to release great amounts of electric current over a long period of time improves. Due to this embodiment, it is possible to utilise the energy storage more efficiently than before. The cooling may further reduce the risk of overheating of the energy storage and extend its operating life.

The idea of an embodiment is that the drive equipment comprises a plurality of electric components affecting the transfer drive. Each of these components is provided with its own cooling circuit that constitutes a part of the liquid cooling system. The cooling circuits are provided with control means that may control the liquid flow of each individual circuit. The control unit may control said control means and thus control the cooling of the component connected to the cooling circuit.

The idea of an embodiment is that the control unit comprises at least one control strategy, in accordance with which the control unit is arranged to maintain the temperature of the electric component affecting the transfer drive lower than a predefined maximum temperature. Thus, the control unit controls the cooling of the component in the first control step in response to a temperature rise of the component. If the control unit detects that despite the higher efficiency of the cooling the temperature rise of the component cannot be controlled, the control unit proceeds to the second control step, in which it limits not only the cooling but also the electric current passing through the component. The control unit starts to limit the power only when it is discovered that the measure in the first control step is insufficient. When the temperature of the component is again made lower than the maximum temperature, the control unit removes the power limitation of the component and continues the component-specific cooling.

The idea of an embodiment is that cooling liquid of the cooling system is precooled.

The idea of an embodiment is that the rock drilling rig is provided with one or more air-water heat pumps, by which cooling liquid of the cooling system can be cooled. A heat pump is suitable for both precooling and cooling during transfer drive.

The idea of an embodiment is that one or more electric components of the drive equipment is/are precooled already before starting the transfer drive, thus preparing in advance for the following temperature rise of the component during the transfer drive. When the component is precooled, its temperature will rise to its maximum temperature slower when it is started to be loaded.

The idea of an embodiment is that the liquid cooling system is precooled during drilling. During drilling, the carrier of the rock drilling rig is in its place at the drilling site. There is thus enough time and capacity to precool the cooling liquid of the system and possibly also components of the drive equipment for the following transfer drive.

The idea of an embodiment is that the liquid cooling system and components included in the drive equipment are precooled during drilling. The rock drilling rig is connected at the drilling site to an external flushing line, from which water or a similar flushing fluid is supplied to the rock drilling rig. Typically the supply temperature of the flushing line is relatively low. This cool flushing fluid may be used for precooling the liquid cooling system during drilling.

The idea of an embodiment is that the control unit comprises one or more control strategies for controlling precooling. The control unit may control the precooling automatically or on the basis of control commands given by the operator.

The idea of an embodiment is that data on the following transfer drive are set in the control unit. The control unit also comprises a control strategy, in accordance with which the control unit is arranged to increase the cooling of at least one electric component affecting transfer drive before starting the transfer drive. The control unit may also estimate the load to be applied to the electric components of the drive equipment during the following transfer drive and distribute cooling capacity of the cooling system by taking into account the predicted, following load of the components. The control system is thus able to prepare for the following transfer drive and for the load to be applied to the components of the drive equipment.

The idea of an embodiment is that the rock drilling rig comprises at least one hydraulic system. The liquid cooling system of the drive equipment comprises at least one heat exchanger, by which heat may be transferred between the liquid cooling system and the hydraulic system. In this way, heat load between two different fluid circuits can be balanced. This embodiment allows an increase of the cooling capacity in the rock drilling rig by utilising the existing systems.

The idea of an embodiment is that the heat exchanger between the liquid cooling system and the hydraulic system is a heat pump. A heat pump is an efficient apparatus for transferring heat energy from one fluid to another.

The idea of an embodiment is that the hydraulic system of the rock drilling rig is connected to the liquid cooling system, whereby hydraulic fluid of the hydraulic system is circulated for cooling at least the electric components of the drive equipment.

The idea of an embodiment is that the rock drilling rig comprises a drilling hydraulic system, to which at least one rock drilling machine and at least one actuator are connected for moving the drilling boom. This drilling hydraulic system is connected to the liquid cooling system, whereby hydraulic fluid of the system is circulated for cooling at least the electric components of the drive equipment.

The idea of an embodiment is that the control unit comprises a control strategy, according to which it predicts the following temperature rise in at least one electric component affecting the transfer drive and increases the cooling power in advance. The temperature rise may be predicted on the basis of electric power supplied to the component. The prediction may further take into account the temperature of the surroundings and other conditions. The control system may also include data on the following transfer drive, whose duration, driving route profile, operator driving style, driving route speed limits and recommendations and other driving data the control system may use for pre-estimating the following load of the components of the drive equipment and for controlling the cooling and the operation of the system on the basis of this estimate.

BRIEF DESCRIPTION OF THE FIGURES

Some embodiments will be explained in greater detail in the attached drawings, in which.

In the figures, embodiments of the invention are shown simplified for the sake of clarity. Similar parts are denoted with the same reference numerals in the figures.

DETAILED DESCRIPTION OF SOME EMBODIMENTS

Figure 1:
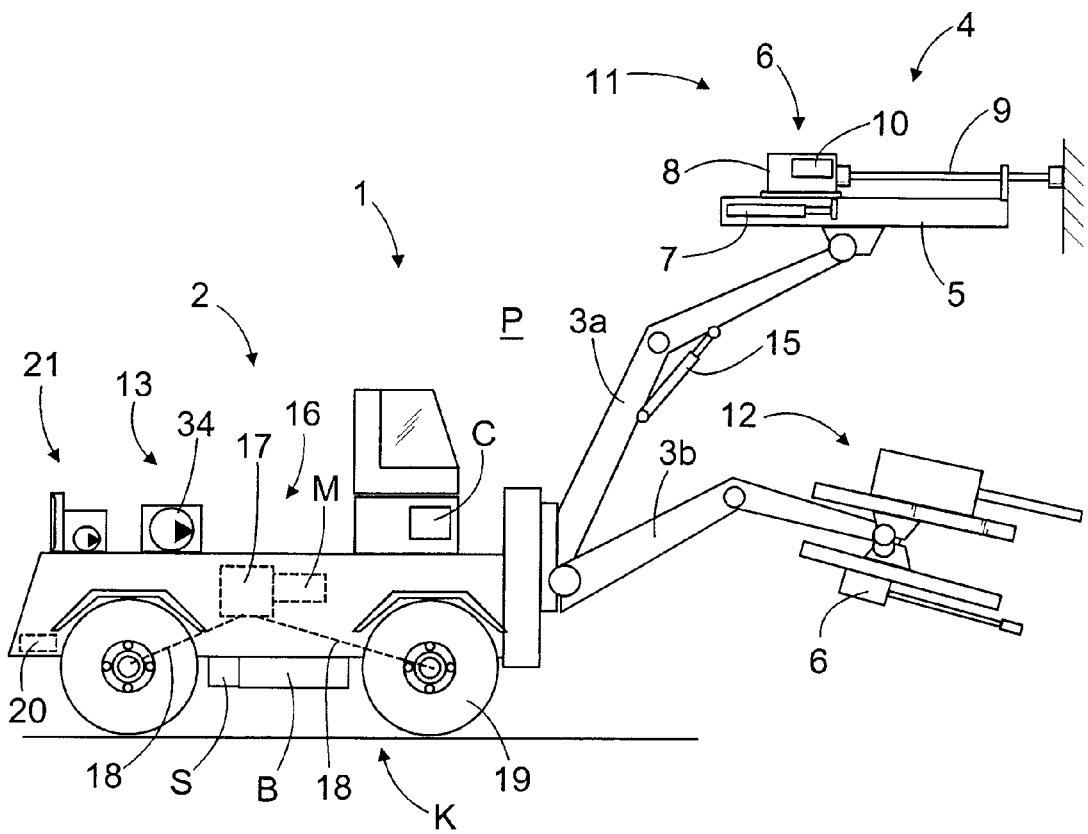
FIG. 1 is a schematic side view of a rock drilling rig driven to a drilling site, FIG. 2 schematically shows drive equipment having an electric drive motor and connected to a liquid cooling system, FIG. 3 schematically shows second drive equipment, in which an electric motor runs hydraulic drive transmission and which is connected to a liquid cooling system, FIG. 4 schematically shows a liquid cooling system, which is cooled by utilising a drilling hydraulic system, FIG. 5 schematically shows details associated with controlling and monitoring of the liquid cooling system.

FIG. 1 shows a feasible rock drilling rig 1 comprising a movable carrier 2 which is provided with one or more drilling booms 3a, 3b equipped with a drilling unit 4. The drilling unit 4 may comprise a feed beam 5 provided with a rock drilling machine 6 that may be moved on the feed beam 5 by means of a feed device 7. The rock drilling machine 6 may comprise a percussion device 8 for generating impact pulses on a tool 9, and a rotating device 10 for rotating the tool 9. Further, it may include a flushing device. The boom 3a shown in the figure and the drilling unit 4 arranged thereto are intended for drilling boreholes in a face 11 of a tunnel or a corresponding drilling site. Alternatively, the boom and the drilling unit thereon may be designed for drilling fan-like boreholes in a ceiling and walls of a rock cavern. Further, the rock drilling rig 1 may comprise a boom 3b, which is provided with a bolting device 12, which also comprises a rock drilling machine 6. The rock drilling rig 1 may comprise a hydraulic system 13, which includes a hydraulic pump 34, hydraulic channels, a tank and necessary control means, such as valves and the like. The hydraulic system 13 may be a drilling hydraulic system, to which actuators 15 necessary for moving the drilling booms 3a, 3b and the rock drilling machine 6 are connected. The rock drilling rig 1 also comprises one or more control units C arranged to control the systems of the rock drilling rig 1. The control unit C may be a computer or a corresponding control device comprising a processor, a programmable logic or any other control device suitable for the purpose, to which it is possible to set at least one control strategy, according to which it carries out controlling independently or in cooperation with the operator.

At a drilling site P, one or more boreholes are drilled with the rock drilling rig 1. When the tasks determined for the drilling site P have been completed, the rock drilling rig 1 is transferred away from the drilling site P to a new drilling site or somewhere else, for instance to be serviced. The rock drilling rig 1 is provided with drive equipment 16 which does not include a combustion engine, i.e. it is combustion-engine-free. Instead, the drive equipment 16 includes one or more electric motors M, which generate the power required in the transfer drive. The electric motor M may be connected to a gear box 17, from which rotating power is transmitted through shafts or corresponding transmission members 18 to one or more wheels 19. The energy required in the transfer drive may be charged to an energy storage B, which may be a battery, for instance. The drive equipment 16 may additionally include one or more control devices S and one or more brake resistors 20. The drive equipment 16 thus comprises a plurality of electric components K, which affect the transfer drive. These components K are loaded during transfer drive and they generate heat, the degree of which is relative to the electric energy passing through each component. As is commonly known, electric components have temperature limits that should not be exceeded, or otherwise a consequence could be a damaged component. The rock drilling rig 1 may be provided with a liquid cooling system 21, by which it is possible to cool the electric components K included in the drive equipment 16.

Figure 2:
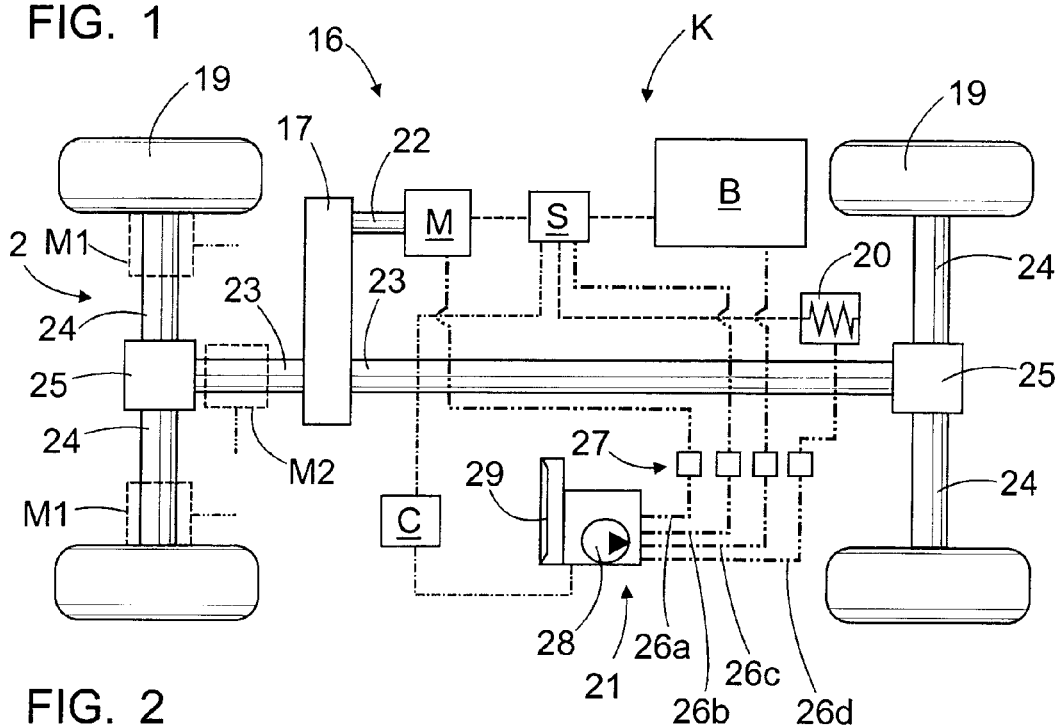

FIG. 2 illustrates drive equipment 16 and cooling of its electric components K by means of a liquid cooling system 21. In the drive equipment 16, the electric motor M may be connected through an anti-slip transmission path 22 directly to the gear box 17, which may include one, two or more gears in the driving direction and correspondingly in the reverse direction. The rotating torque may be transmitted from the gear box to wheel shafts 24 by means of shafts 23. An angle drive 25 or the like may be arranged between the shafts 23 and 24. In that case, between the wheels 19 and the electric motor M there is mechanical, anti-slip transmission. The electric motor M may also be used for braking, in which case it serves as a generator and converts kinetic energy of the carrier 2 into electric energy, for instance, when driving down the drive ramps in the mine. Generated electric energy may be charged to an energy storage B and thus recovered. Surplus electric energy, which cannot be utilized, may be converted into thermal energy in the brake resistor 20. The drive equipment 16 further includes a control device S, which may comprise a frequency converter, by which the rotation of the electric motor M may be controlled steplessly both during the drive and during the braking. The control device S may further comprise other necessary electric control devices for controlling electric currents in the electric driving system. The control device S may comprise, for instance, control means for connecting the energy storage B and the brake resistor 20 to the electric driving system. The operation of the control device S is controlled by the control unit C.

In this application, a "frequency converter" refers to a control means, by which the rotation speed of the electric drive motor can be controlled in a stepless manner. The frequency converter may be an inverter or it may be a DC/AC converter, which controls the running of the electric motor.

It appears from FIG. 2 that the control unit C also controls the operation of the liquid cooling system 21. The liquid cooling system 21 may comprise a plurality of cooling circuits 26a to 26d, to each of which one or more electric components K of the drive transmission are connected. The cooling circuits 26 may be provided with one or more valves or a corresponding control means 27, by which it is possible to affect the liquid flow in the cooling circuit 26. The control unit C may control these control means 27 such that the cooling in accordance with the cooling strategy will be realized. It is further possible that a pump 28 of the liquid cooling system 21 is controlled, whereby the flow of the cooling liquid may be increased or reduced in the system. Further, the liquid cooling system 21 comprises at least one cooling unit 29, with which heat is transferred away from the cooling liquid, i.e. it is cooled. The cooling unit 29 may comprise a radiator of a conventional type and a blower for boosting the cooling. Alternatively, the cooling unit 29 may comprise a heat exchanger, by which heat is transferred from the cooling liquid to another liquid, such as that of the hydraulic system. Furthermore, it is feasible that the cooling unit 29 comprises a heat pump having a compressor with which heat can be transferred from the cooling liquid to another liquid or to the outdoor air. The control unit C may also control the operation of the cooling unit 29 such that the temperature of the cooling liquid can be affected. When necessary, it is possible to pre-cool the cooling liquid.

FIG. 2 shows, denoted with broken lines, yet another alternative embodiment, in which the electric drive motor is coupled in an anti-slip manner to the transmission means. In connection with the shaft 24 on the left, there are wheel-specific electric hub motors M1, in connection with which there may be a required gear box. Further, rotating torque may be provided to the shaft 24 by means of one common electric drive motor M2. The motors M1 and M2 may be connected to the liquid cooling system 21.

Figure 3:
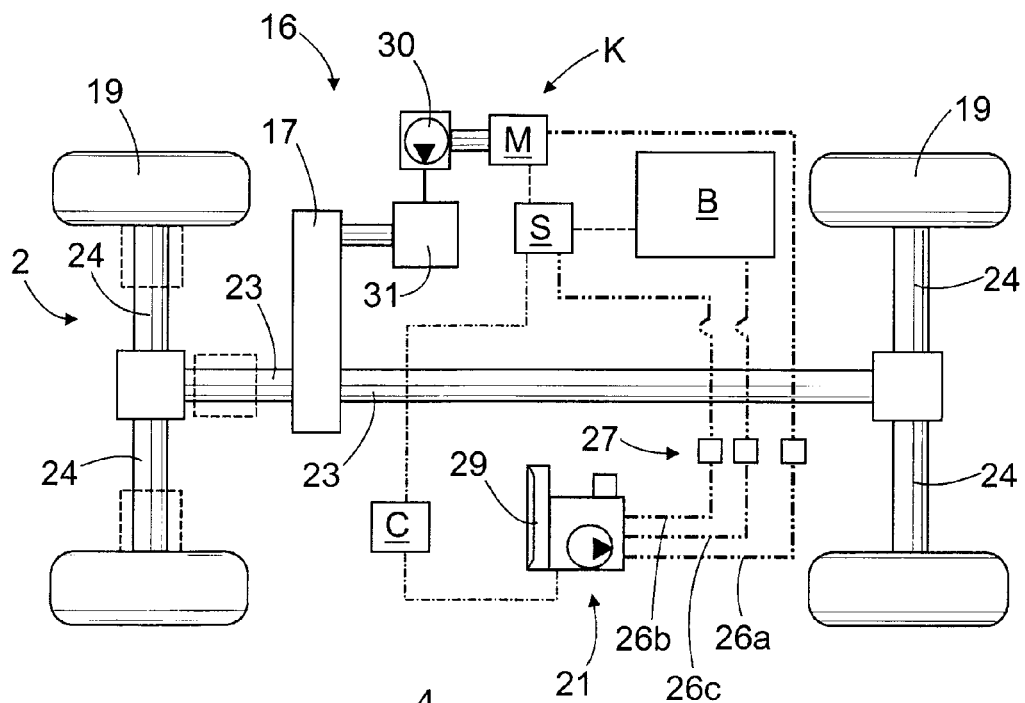

FIG. 3 shows an embodiment of the drive equipment 16, where the electric motor M is arranged to run a hydraulic pump 30, and the generated hydraulic power drives a hydraulic motor 31 that is connected to the gear box 17. Thus, hydraulic drive transmission is concerned. The electric motor M included in the drive equipment may be cooled by means of the liquid cooling system 21 and, in addition, it may be controlled by means of the control device S in a similar manner as the embodiment shown in FIG. 2. The structure and control principles of the liquid cooling system 21 may also correspond to those shown in FIG. 2. FIG. 3 shows in broken lines hydraulic hub motors H1 alternative to the hydraulic motor 31 and the gearbox, and a hydraulic motor H2 driving the shaft 24.

Figure 4:
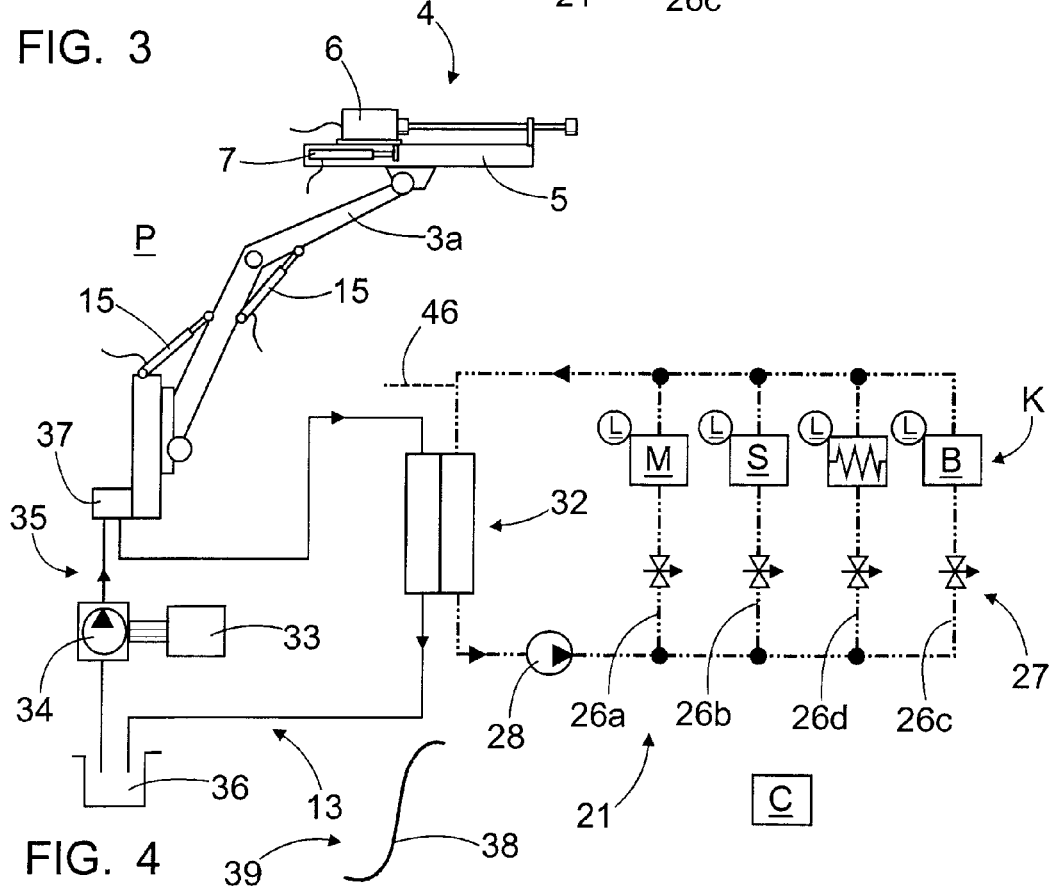

FIG. 4 illustrates an arrangement in which there is a heat exchanger 32 between the liquid cooling system 21 and the drilling hydraulic system 13, allowing heat to be transferred between the systems. Heat load between the two different liquid systems may thus be balanced. The drilling hydraulic system 13 may comprise a motor 33, a pump 34, channels 35, a tank 36 and control means 37 for guiding hydraulic fluid to the actuators 15 of the boom 3a, to the feed device 7 and to the rock drilling machine 6 that are connected to the system. Hydraulic fluid can be circulated in the drilling hydraulic system during transfer drive, whereby heat can be transferred to the hydraulic system.

FIG. 4 shows a channel 38, from which flushing fluid may be supplied to the rock drilling rig when it is driven to the drilling site P. By means of the flushing fluid, drilling chips are flushed away from the borehole being drilled. Flushing fluid is typically water and has a low temperature. With this flushing fluid system 39 it is possible to cool the liquid cooling system 21 at the drilling site P. Between the fluid systems 21 and 39 there may be a heat exchanger or a heat pump for transferring heat. The figure further shows a strong simplification of an embodiment where the cooling system 21 is connected by means of a connection 46 to the hydraulic system 13, whereby it is possible to use hydraulic fluid as a cooling liquid.

FIG. 4 also shows that the temperature of the electric components K of the drive equipment 16 may be monitored by means of temperature sensors L, sensor data of which may be transmitted to the control unit C for controlling the cooling system 21.

Figure 5:
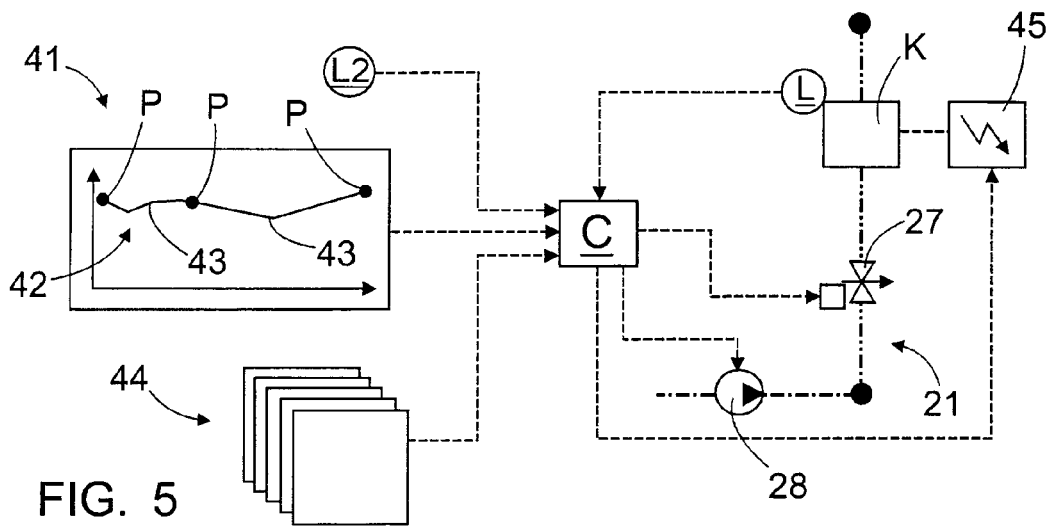

FIG. 5 illustrates controlling of the liquid cooling system 21. Temperature data may be transmitted to the control unit C from the temperature sensor L in connection with the component being monitored and from the temperature sensor L2 monitoring the temperature of the surroundings. It is further possible that, during controlling, the control unit C takes into account route data 41, such as a driving route profile 42 and duration of transfer drive 43 between drilling sites P. The control unit C may further take into account one or more data elements 44 and, naturally, the manual control commands of the operator. A data element 44 may comprise data, on the basis of which the control unit C may predict heat generated in the component K when a specific electric current is supplied to it. In accordance with these data and the control strategy provided for the control unit C, the control unit C controls the pump 28 of the cooling system 21, the control means 27 or affects the cooling in some other manner. Furthermore, if the cooling of the component K does not lower the temperature sufficiently, the control unit C may limit the electric current to be passed through the component K by means of a controller 45.

Figure 6:
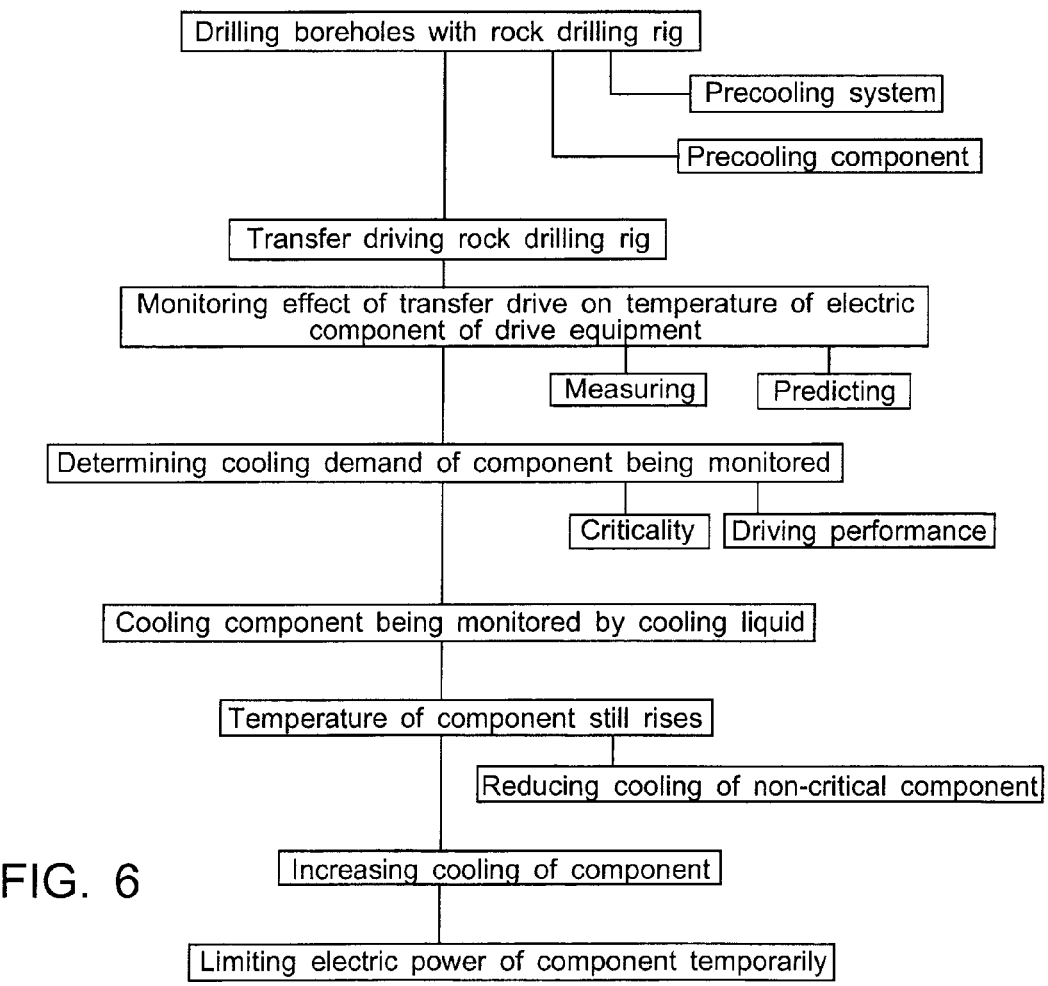
FIG. 6 shows a diagram of the principle for managing the temperature of electric drive transmission.

FIG. 6 shows a diagram of steps and control principles described in this application. According to the diagram, the liquid cooling system, the cooling liquid thereof and the component connected to the system may be precooled before the transfer drive, whereby it is possible to prepare in advance for the following heat load of the drive equipment. As the diagram shows, the heat load of the components may be monitored during transfer drive by either measuring or predicting, for instance by taking into account the conditions and the electric current to be supplied to the component. The cooling demand of critical components of the drive equipment may be prioritized over that of less significant components. In the determination of the cooling demand, the duration and quality of the following driving performance may also be taken into account. For instance, if the driving route includes many downhill sections, the cooling of the brake resistor may be boosted in advance. The capacity of the cooling system may be increased temporarily by switching off the cooling of non-critical components either partially or completely. If the temperature of the component cannot be controlled by means of cooling, the electric power supplied through it has to be limited until the situation is under control again.

Although the drive equipment of the rock drilling rig is completely without a combustion engine, the carrier of the rock drilling rig may have a reserve power unit which may comprise a combustion engine. This combustion engine drives a generator for producing electric energy. However, the reserve power unit is not included in the drive equipment, and it is only intended for use in special situations, for instance when the battery is flat or damaged.

In some cases, features disclosed in this application may be used as such, irrespective of other features. On the other hand, features disclosed in this application may, if required, be combined to form various combinations.

The drawings and the related description are only intended to illustrate the idea of the invention. Details of the invention may vary within the scope of the claims.

The invention claimed is:

1. A rock drilling rig which is used for drilling at drilling sites and transfer-driven between the drilling sites, the rock drilling rig comprising:
   a movable carrier;
   combustion-engine-free drive equipment for performing a transfer drive of the rock drilling rig, the drive equipment including at least one electric motor and at least one electric control device for affecting the transfer drive;
   at least one energy storage, in which at least electric energy required for the transfer drive may be stored;
   at least one boom movable in relation to the carrier;
   at least one rock drilling machine arranged on the at least one boom;
   at least one liquid cooling system, wherein the at least one electric component affecting the transfer drive is connected to the at least one liquid cooling system; and
   at least one control unit, wherein the control unit is arranged to control the cooling of the at least one electric component connected to the at least one liquid cooling system and the at least one liquid cooling system being precoolable before a following transfer drive.

2. The rock drilling rig of claim 1, further comprising at least one temperature sensor arranged to monitor the at least one electric component of the drive equipment; and
   wherein the at least one control unit is arranged to control the cooling of the at least one electric component connected to the at least one liquid cooling system on the basis of the temperature sensing.

3. The rock drilling rig of claim 1 wherein the at least one control unit includes a control strategy, according to which it predicts a following temperature rise in the at least one electric component of the drive equipment and increases the cooling power in advance.

4. The rock drilling rig of claim 1, wherein the at least one control unit includes a control strategy, according to which it increases the cooling power of at least one electric component affecting the transfer drive by taking into account at least one of the following criteria: electric power supplied to the at least one electric component; temperature of the surrounding space; and planned duration of a next transfer drive.

5. The rock drilling rig of claim 1, wherein the drive equipment includes at least one frequency converter for controlling the at least one electric motor, and the at least one electric motor and the frequency converter are connected to the at least one liquid cooling system.

6. The rock drilling rig of claim 1, wherein the at least one electric motor serves as a drive motor; and further comprising a fixed mechanical power transmission connection between the at least one electric drive motor and at least one traction wheel, the at least one electric drive motor being arranged to serve as a generator during braking of the transfer drive, producing electric energy to the electric system of the rock drilling rig, wherein the electric system is provided with at least one electric brake resistor for converting surplus electric energy produced during braking into heat; and said brake resistor being connected to the at least one liquid cooling system.

7. The rock drilling rig of claim 1, wherein the at least one energy storage is connected to the at least one liquid cooling system.

8. The rock drilling rig of claim 1, wherein the drive equipment includes a plurality of electric components affecting the transfer drive, each of the plurality of components being provided with a cooling circuit, each cooling circuit comprising a part of the at least one liquid cooling system, wherein each cooling circuit is provided with at least one control means for controlling liquid flow, and wherein the at least one control unit is arranged to control said at least one control means to affect the cooling of each component connected to a respective cooling circuit.

9. The rock drilling rig of claim 1, wherein the at least one control unit includes at least one control strategy, according to which the at least one control unit is arranged to maintain the temperature of an electric component affecting the transfer drive lower than a predefined maximum temperature, wherein the at least one control unit is arranged to control the cooling of the component in a first control step in response to a temperature rise of the component; and in a second control step the at least one control unit is arranged to limit the electric current passing through the component in response to insufficiency of the first control step.

10. The rock drilling rig of claim 1, wherein data on the transfer drive are set in the at least one control unit and the at least one control unit includes a control strategy, according to which the control unit is arranged to increase the cooling of at least one electric component affecting the transfer drive before starting the transfer drive and by taking into account a predicted, following load caused by the transfer drive on the component.

11. The rock drilling rig of claim 1, further comprising at least one hydraulic system and the at least one liquid cooling system includes at least one heat exchanger for transferring heat between the at least one liquid cooling system and the at least one hydraulic system.

12. The rock drilling rig of claim 1, further comprising at least one hydraulic system and the at least one liquid cooling system includes at least one heat exchanger for transferring heat between the liquid cooling system and the hydraulic system, wherein the heat exchanger is a heat pump.

13. A The rock drilling rig of claim 1, further comprising at least one hydraulic system, and wherein hydraulic fluid of the at least one hydraulic system is circulated in the at least one liquid cooling system to cool at least one electric component.

14. The rock drilling rig of claim 1, further comprising a drilling hydraulic system, to which at least one rock drilling machine and at least one actuator for moving the at least one drilling boom are connected.

15. A method for controlling the temperature of a drive transmission of a rock drilling rig, the method comprising the steps of:
   monitoring a temperature of at least one electric component of drive equipment during transfer drive of the rock drilling rig;
   maintaining the temperature of the monitored at least one electric component lower than a predefined maximum temperature;
   cooling the monitored at least one electric component by means of a liquid cooling system; and
   precooling the liquid cooling system before starting the transfer drive and preparing in advance for a following temperature rise in the transfer drive.

16. The method of claim 15, further comprising the step of cooling at least one of the following electric components included in the drive equipment and affecting the transfer drive; a drive motor; a frequency converter of the drive motor; a brake resistor; and an energy storage.

17. The method of claim 15, further comprising the steps of:
   connecting a plurality of components included in the drive equipment to one common liquid cooling system by using component-specific cooling circuits; and
   controlling the flow of cooling liquid in each of the component-specific cooling circuits separately with a control means.

18. The method of claim 15, further comprising the step of measuring the temperature of at least one electric component included in the drive equipment by means of at least one temperature sensor.

19. The method of claim 15, further comprising the step of determining, in a control unit, a cooling demand of at least one electric component affecting the transfer drive by taking into account at least one of the following criteria: electric power supplied to the at least one component; temperature of a surrounding space; planned duration of a next transfer drive; and controlling the cooling on the basis of the cooling demand.

20. The method of claim 15, further comprising the steps of:
   measuring the temperature of at least one electric component included in the drive equipment by means of at least one temperature sensor; and
   limiting electric current supplied to the at least one electric component in response to sensor data, according to which the temperature of the component will rise despite cooling.

21. The method of claim 15, further comprising the step of precooling a cooling liquid of the liquid cooling system.

22. The method of claim 15, further comprising the step of precooling at least one electric component of the drive equipment before starting the transfer drive, thus preparing in advance for a following temperature rise of the component in the transfer drive.

23. The method of claim 15, further comprising the step of precooling the liquid cooling system during drilling.

24. The method of claim 15, further comprising the step of precooling the liquid cooling system with a flushing fluid used in drilling.

25. The method of claim 15, further comprising the step of considering in advance, in controlling of the cooling, a drive profile and a distance of a following transfer drive of the rock drilling rig, as well as a resulting load on the at least one electric component of the drive equipment.

26. A liquid cooling system of an electrically driven rock drilling rig, comprising:
   as a component to be cooled, at least one electric component included in drive equipment and affecting a transfer drive of the rock drilling rig; and
   means for precooling the liquid cooling system before the transfer drive.

27. The liquid cooling system of claim 26, further comprising at least one temperature sensor for monitoring the temperature of the at least one electric component and at least one control unit including at least one control strategy for controlling the cooling of the electric component being monitored on the basis of the temperature sensor data.

\* \* \* \* \*